United States Patent
Bäker et al.

(10) Patent No.: US 6,353,788 B1
(45) Date of Patent: Mar. 5, 2002

(54) METHOD FOR REGULATING SPEED AND DISTANCE DURING PASSING MANEUVERS

(75) Inventors: Wolfgang Bäker, Braunschweig; Thomas Ruchatz, Lehre; Peter Andreas, Gifhorn, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/581,666
(22) PCT Filed: Nov. 20, 1998
(86) PCT No.: PCT/EP98/07492
§ 371 Date: Sep. 11, 2000
§ 102(e) Date: Sep. 11, 2000
(87) PCT Pub. No.: WO99/30919
PCT Pub. Date: Jun. 24, 1999

(30) Foreign Application Priority Data

Dec. 15, 1997 (DE) .................................. 197 55 609
May 12, 1998 (DE) .................................. 198 21 122

(51) Int. Cl.⁷ ............................................. B60T 7/12
(52) U.S. Cl. .......................... 701/96; 701/93; 701/301; 340/435; 340/436; 340/903; 342/70
(58) Field of Search ................. 701/96, 93, 116, 701/117, 118, 119, 301; 340/435, 436, 903; 342/455, 70, 109, 118, 71

(56) References Cited

U.S. PATENT DOCUMENTS

| | | |
|---|---|---|
| 5,278,764 A | 1/1994 | Haruhiko et al. ........... 701/301 |
| 5,375,060 A | 12/1994 | Noecker et al. |
| 5,400,864 A | 3/1995 | Winner et al. |
| 5,871,062 A | 2/1999 | Desens et al. |
| 5,999,874 A * | 12/1999 | Winner et al. .............. 701/93 |
| 6,232,910 B1 * | 5/2001 | Bell et al. ..................... 342/70 |

FOREIGN PATENT DOCUMENTS

| | | |
|---|---|---|
| DE | 36 37 165 | 5/1988 |
| DE | 42 00 694 | 7/1993 |
| DE | 42 09 060 | 9/1993 |
| DE | 195 14 023 | 10/1996 |

* cited by examiner

Primary Examiner—Tan Nguyen
Assistant Examiner—Arthur D. Donnelly
(74) Attorney, Agent, or Firm—Kenyon & Kenyon

(57) ABSTRACT

A method and device for regulating speed and/or distance of a first vehicle to at least one other vehicle driving ahead of the first vehicle in connection with a passing maneuver. The method or device provides a detection system associated with the first vehicle which continuously detects the vehicle directly in front and the position of the turn signal lights, as well as the yaw rate and/or steering position of the first vehicle. The method or device of the present invention further provides an evaluation unit which continuously ascertains setpoint value data for regulating the speed of the first vehicle and its distance to the at least one other vehicle directly in front from this data.

21 Claims, 4 Drawing Sheets

METHOD FOR REGULATING SPEED AND DISTANCE DURING PASSING MANEUVERS

FIELD OF THE INVENTION

The present invention relates generally to a method for regulating speed and/or distance of a first vehicle to at least one other vehicle driving ahead in connection with a passing maneuver.

BACKGROUND OF THE INVENTION

The safety of vehicular passengers is of concern when initiating and executing passing maneuvers. During passing maneuvers the attention of the driver must be focused simultaneously on various ranges of the drivers environment. It first must be determined whether the driving situation in the passing lane or oncoming lane permits a passing maneuver, that is, a passing maneuver is, thus, not rendered impossible from the beginning by vehicles approaching from behind or from the front. If the driver recognizes that the passing lane or oncoming lane would generally permit a passing maneuver, then he or she must also pay attention to vehicles that could be passing already and vehicles coming up from behind, while simultaneously having to keep in mind the driving behavior of the vehicles driving in front of him, especially that of the vehicle driving directly in front of him. After deciding for a passing maneuver, the driver must continue to make these observations constantly while having to create the conditions necessary to be able to move into the passing lane and initiate the passing maneuver, by operating the turn signal and accelerating. In this connection, it is especially important that the driver continually check the driving behavior of the vehicle driving directly in front of him here, as well as his own accelerating behavior, so that no dangerous situations can result from driving up too closely and/or the velocity of the directly preceding vehicle changing.

The passing maneuver itself is an especially risky driving situation because of the plurality of observations to be made simultaneously, as well as the actions to be taken as a result of these. Therefore, efforts have already been made to be able to render this especially risky driving situation less dangerous using systems which relieve or assist the driver. For example, a method for regulating speed and distance of a vehicle is known from DE 42 00 694 A1 which is hereby incorporated by reference herein, in which the actual distance, as well as the instantaneous velocity of a vehicle, can be detected, and the setpoint values for distance and speed of this vehicle can be ascertained and set from this. The present invention starts from the assumption that an intervention of the driver, which can occur under particular driving circumstances, must have absolute priority over the automatically operating cruise control or adaptive cruise control. Therefore, the adaptive cruise control in the known method is interrupted temporarily after the driver intervenes. This should ensure that the system reacts flexibly to various driving situations, in which case activating a turn signal and/or operating the gas pedal can be used to trigger such interruptions. It may be that the method put forward allows the driver to intervene directly in a proceeding automatic-control situation; however, especially in the critical time interval of a passing maneuver, namely, as the vehicle approaches the vehicle driving in front and simultaneously accelerates, by switching off the adaptive cruise control and/or the cruise control, a safety gap is created exactly at the point when it is particularly important to support the driver. If, for example, the driver operates the turn signal upon approaching a vehicle driving directly in front, then the time elapsing between operating the turn signal and the vehicle accelerating and pulling out into the passing lane is very short in normal passing maneuvers. However, this manner of pulling-out and simultaneously accelerating to reach the speed of traffic flow in a passing lane, e.g., of a motorway, can result in the vehicle approaching the preceding vehicle very closely, in which case the operation of an adaptive cruise control would create an especially large safety distance. However, the described system is completely deactivated in this very time frame and first reactivated, e.g., after two or three seconds.

SUMMARY OF THE INVENTION

The present invention provides a method and/or device for regulating the speed and/or the distance of a first vehicle to at least one preceding vehicle in connection with a passing maneuver, in which the driver is supported especially during the passing maneuver, thereby allowing it to be performed more safely without the driver being restricted in his free decision to pass; and in which the execution of the passing maneuver is simultaneously rendered safer by supporting the driver.

An object of the present invention is achieved in interaction with the features according to the following: a method or device for regulating speed and/or distance of a first vehicle (1) to at least one vehicle (2) driving ahead in connection with a passing maneuver, in which a detection system (15) provided at the first vehicle (1) continuously detects at least the vehicle directly in front, as well as at least the position of the turn signal lamps (16, 17), and the yaw rate and/or steering position of the first vehicle (1); and an evaluation unit continuously ascertains setpoint values for regulating the speed of the first vehicle (1) and its distance at least to the vehicle (2) directly in front from this data, wherein after the driver of the first vehicle (1) actuates the turn signal lamp (16) indicating a passing maneuver, in preparation for the passing maneuver, the distance (12) to the vehicle (2) driving directly in front is reduced, at most, until a minimum permissible distance (13) to the vehicle (2) directly in front is reached; the evaluator checks, at least upon reaching the minimum permissible distance (13), whether a collision with the vehicle (2) driving directly in front will occur in the prevailing driving situation; and the initiated passing maneuver is aborted in response to determining a danger of collision with the vehicle (2) driving directly in front. The dependent claims describe preferred further refinements of the method according to the present invention.

The method and/or device according to the present invention is that after the driver of the first vehicle operates the turn signal light himself, which is arranged in the direction of travel on the driver's side of the vehicle, and in order to prepare for the passing maneuver, the distance to the vehicle driving directly in front is reduced at most until a minimum allowable distance to the directly preceding vehicle is reached.

In this case, the evaluator tests, at least when the minimum allowable distance is reached, whether a collision with the vehicle driving in front can occur in the present driving situation. If it is determined that the first vehicle is in danger of colliding with the vehicle driving directly in front, the initiated passing maneuver is aborted, and the first vehicle is brought back to a specifiable safe distance.

Particularly during the critical period of time when the first vehicle is approaching the vehicle driving directly in front, the method according to the present invention is used to constantly monitor that there is no drop below a minimum distance set in the system or dependent on the situation. In this connection, the operation of the turn signal on the driver's side, which normally must precede a passing maneuver, is chosen to trigger such monitoring. As is also the case in a non-assisted passing maneuver, the distance to the vehicle driving directly in front can be reduced at most until the minimum allowable distance is reached. At least upon reaching this minimum allowable distance, the evaluator checks whether, for example, based on the detected distance values of the vehicle in front and the physical operating quantities of the first vehicle, a further reduction in distance between the first vehicle and the vehicle driving ahead can cause a collision with the vehicle driving ahead. This is the case if the first vehicle were to make contact with the preceding vehicle within appropriate tolerance values, due to the driver not steering or not steering sufficiently.

If such a danger of colliding with the vehicle driving directly in front is recognized, then the initiated passing maneuver is aborted, and the first vehicle is brought back to a specifiable safe distance. For example, this can prevent the occurrence of rear-end collisions because of lack of attention on the part of the driver and/or the first vehicle not being steered, as occur when the preceding vehicle is followed too closely.

Driving situations are considered as well, which arise from the directly preceding vehicle being braked, and result in the distance to this vehicle being reduced unacceptably. If in such a driving situation, the attention of the driver of the first vehicle is still completely occupied with observing the traffic in the passing lane prior to the passing maneuver, then he or she can easily fail to see the preceding vehicle braking, and a rear-end collision can result in spite of he or she acting correctly in the beginning.

In an especially preferred further refinement, the evaluator determines a collision danger when the preceding vehicle in the prevailing driving situation the vehicle driving directly in front is still being detected by the detector after a defined time has elapsed. Normally, after the first vehicle has already pulled out completely or even partially into the passing lane or the oncoming lane, the detector, which normally covers an essentially conical detecting range in the direction of travel of the first vehicle, no longer detects the directly preceding vehicle in this immediate detection range. Such a loss of the detection signal or an intense change in the signal detected from the vehicle driving ahead can now be taken to mean that the steering and the present driving situation are sufficient to permit the first vehicle to drive around the preceding vehicle without it resulting in a collision.

In another embodiment, the evaluator can determine a collision danger when the driver's steering in the prevailing driving situation is not sufficient to prevent the first vehicle from colliding with the vehicle driving directly in front. For example, it can be determined if a collision can be safely avoided on the basis of data ascertained by the detector from the vehicle directly in front, on the basis of prevailing velocities or velocity differences, as well as on the steering, even without the complete loss of the signal of the vehicle directly in front. However, if even the possibility of a collision is determined by the evaluator, then the initiated passing maneuver should be aborted for reasons of safety, and the first vehicle brought back to the specifiable safe distance.

The passing maneuver of the first vehicle can be aborted in a preferred manner by reducing the acceleration of and/or braking the first vehicle. Depending on the extent of the reduction of the distance to the preceding vehicle, it may be necessary, apart from throttling back on the accelerator pedal and the resulting engine braking effect, to perform additional braking operations to prevent a collision with the vehicle driving directly in front, which, at this point, is once again moving further in the direction of travel of the first vehicle.

In this case, the first vehicle can be decelerated and/or braked automatically in an advantageous manner upon recognizing a collision danger, up until the predefined safety distance is reached again. Automatically re-increasing the distance to the directly preceding vehicle in such a manner clearly relieves the driver of the first vehicle in this critical driving situation, so that he can direct his attention to required steering and/or observing the other road users.

Furthermore, the turn signal light can also be deactivated in response to aborting the passing maneuver, in order to signal unequivocally to the other road users that the passing maneuver has been terminated. Normal turn signal lights of today do not always switch off automatically, particularly in response to only small steering movements, so that, e.g., the turn signal light is still operating even after aborting the passing maneuver. This can irritate the traffic following behind and result in difficult traffic situations.

Another embodiment of the present invention involves accelerating the first vehicle until the minimum distance is reached, to a speed essentially corresponding to the speed of traffic flow in the passing lane. Some embodiments of the present invention take into account passing on motorways or streets having multiple lanes in the direction of travel, because otherwise, the large difference in speed between the vehicle which has just pulled out to pass and the traffic in the passing lane can require the vehicles traveling in the passing lane to brake. By accelerating the first vehicle, even when the distance to the directly preceding vehicle is large, a speed essentially corresponding to the speed of traffic flow in the passing lane is normally reached quite early already. Especially when the speed has already been increased in this manner, it is useful to pay attention to the distance to the directly preceding vehicle, since the reaction times for unforeseen driving situations must be especially short.

It is particularly advantageous if, after the driver has operated the turn signal light, the first vehicle is accelerated automatically, at most, until the minimum distance has been reached. In this manner, with regard to the acceleration, the driver is in turn relieved of an activity claiming his attention and thus impairing his observation of the traffic situation, the constant monitoring of the distance to the directly preceding vehicle being particularly ensured. By inputting typical passing speeds, e.g. 130 km/h, on motorways or the like, it can be estimated whether the prevailing distance to the vehicle driving directly in front is sufficient at all for reaching such a velocity, or whether it is necessary to pull out prematurely into the passing lane.

It is especially advantageous that the first vehicle be steered out into the passing lane and led past the vehicle driving in front up till now, at least at the attained passing speed. In this case, the sovereignty regarding the manner in which the driver passes is not taken away from him or her, but rather the method according to the present invention simply ensures that foreseeable, critical driving situations are safely avoided.

It is also particularly advantageous to have the adaptive cruise control activated again and the traffic lane checked for a new vehicle driving in front, after a passing maneuver is completed and in response to the right turn signal light being operated and/or a steering movement back into the original lane. This ensures that, when traffic is heavy and there is a cut-in between two vehicles driving relatively close to each other in succession, the driving situation is immediately monitored for the necessary distance, or at least the minimum legal distance, in response to the cut-in.

In another further refinement, the operation of the turn signal light on the passenger side is not considered for regulating speed and/or distance in response to pulling in again after a completed passing maneuver. Such a procedure can be advantageous when the driving speed of the first vehicle should be adapted gradually to the driving speed in the lane opposite to the driver's side, without the first vehicle being sharply decelerated in response to the vehicle, which is now driving directly in front in the lane opposite the driver's side, being immediately detected. In this case, the responsibility of setting a new distance to the vehicle now driving directly in front is reserved for the driver.

In another further refinement, the adaptive cruise control is resumed after a completed passing maneuver, when the detector again detects a new vehicle driving in front again. For example, when there are large gaps between vehicles driving in the lane opposite to the driver's side, it is not particularly important to activate the adaptive cruise control immediately after pulling in again, since a sufficient amount of time can elapse before closing up on the vehicle now driving directly in front.

It is especially important when initiating the passing maneuver, that the state of the turn signal light on the driver's side first be considered after reaching or exceeding a speed threshold value. The reason for this is that the constantly occurring instances of turning off or other changes of direction when traveling at relatively low speeds in city traffic or in simple rural traffic, should not be interpreted as the initiating of passing maneuvers, which activate the cruise control or adaptive cruise control in accordance with the method of the present invention. Along these lines, an advantageous further refinement proposes selecting a speed threshold value of approximately 70 km/h to 80 km/h. Above such speeds, one does not normally turn off or change the direction of travel, but rather passes, e.g. in rural traffic. When the right or left turn signal light is operated below the speed threshold value, the speed and/or distance are not regulated, since it is advantageous for the driver to retain complete sovereignty over the guidance of the vehicle in this case.

In response to operating the right and/or left turn signal light below the speed threshold value, the speed and/or distance can be regulated in another further refinement using a regulation characteristic different from that of a passing maneuver. For example, this could be used with an appropriate regulation characteristic to help simplify the situation for the driver in exiting a motorway, expressway, or the like.

An especially advantageous development of the method and device according to the present invention for braking automatically in an emergency is illustrated in the drawing.

Figure 1:
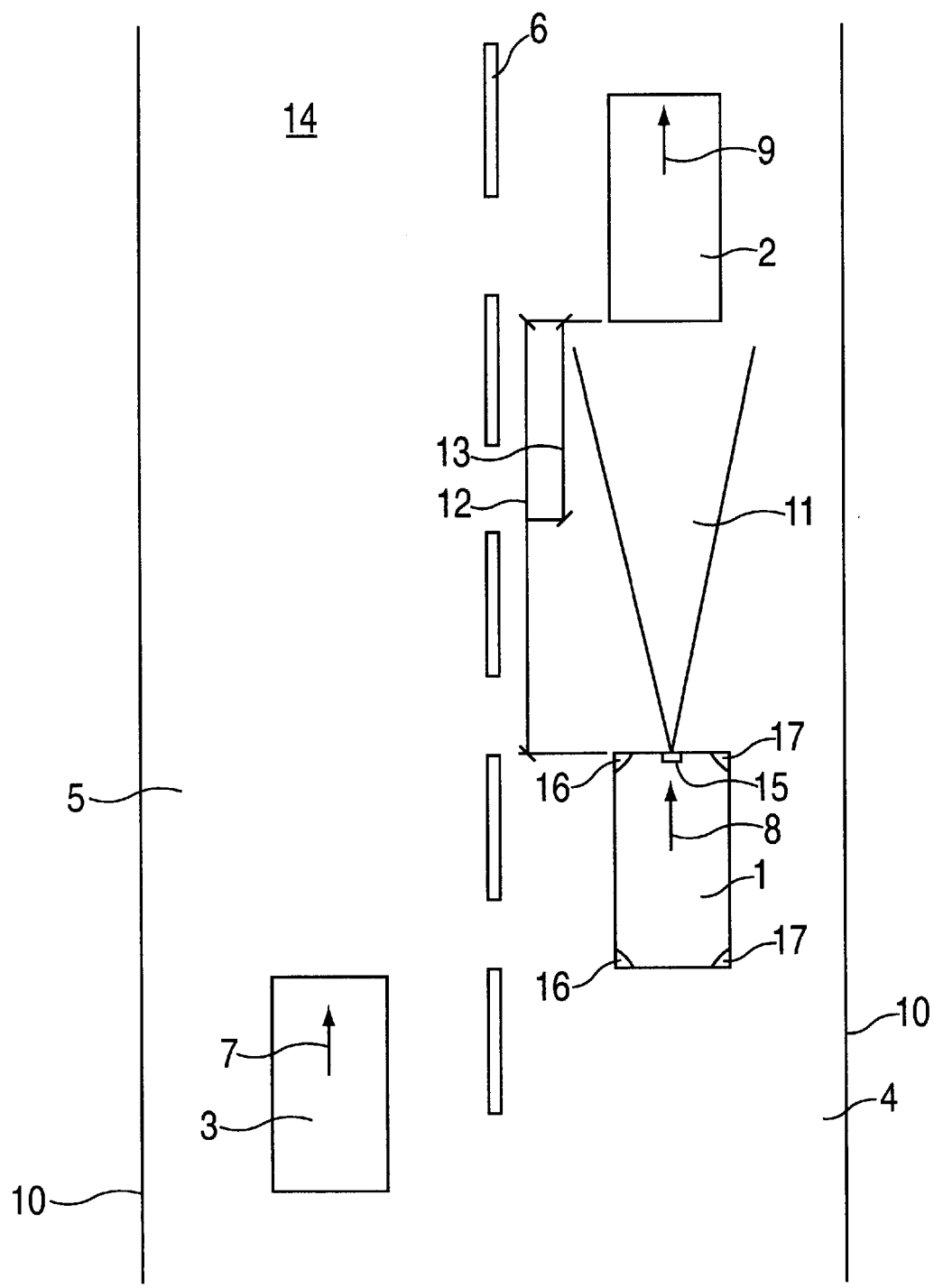
FIG. 1 shows a driving situation associated with a passing maneuver, in which a driver of a first vehicle can initiate a passing maneuver.

FIG. 1 illustrates a driving situation as is normally associated with a passing maneuver, in which a first vehicle 1 is driving in right lane 4 of a street 14 defined by roadway boundaries 10 at a distance 12 from a vehicle 2 driving directly in front. Vehicle 1 travels at the velocity indicated by arrow 8. Vehicle 2 driving directly in front of vehicle 1 travels at a velocity corresponding to arrow 9. A third vehicle 3 traveling at velocity 7 in the same direction of travel as vehicles 1 and 2 is located in passing lane 5 separated by lane marking stripe 6. This vehicle 3 travels at a speed of traffic flow normal for a passing lane 5 of a motorway.

The driving situation depicted in FIG. 1, which is not drawn to scale with regard to the distances of vehicles 1, 2, and 3, allows the driver of vehicle 1 to prepare a passing maneuver, in which he or she passes vehicle 2 by pulling out into passing lane 5 in front of vehicle 3, and pulling in again in front of this vehicle 2. In the conventional passing operation to be undertaken by the driver alone, the driver of vehicle 1 must correctly estimate both velocity 7 of vehicle 3 and velocity 9 of vehicle 2, as well as distance 12 to vehicle 2 and velocity 8 of his own vehicle 1, and correlate these with each other in consideration of the possibility of a passing maneuver. Because of these various influences, which are also associated with observing the traffic that could be approaching when passing on a road with only one lane in the direction of travel, the driver of vehicle 1 can often miscalculate one of the influence quantities, e.g. distance 12 to directly preceding vehicle 2, or also velocity 7 of vehicle 3, which can result in a collision with vehicle 3 or 2 during the passing maneuver, which he initiated based on his miscalculation.

The method according to the present invention supports the driver of vehicle 1 during this passing operation by making a decision regarding the possibility of a passing maneuver and its execution, using signals of a detector 15, as well as of other devices, for detecting the physical quantities and settings corresponding to driving state of vehicle 1, the detector and other devices not being described in further detail.

In the method using detector 15, which is not described in further detail, a range is detected in front of first vehicle 1 and in the travel direction of first vehicle 1, which corresponds to conically-depicted detection range 11. Therefore, vehicles located inside this detection range 11, e.g. vehicle 2 driving directly in front, supply detector 15 with a signal corresponding to distance 12 between first vehicle 1 and the rear section of directly preceding vehicle 2, which is routed to an evaluator in first vehicle 1, the evaluator also not being described here in further detail. For example, in the driving situation shown in FIG. 1, based on velocity 8 of first vehicle 1, on the relative velocity of vehicle 2 that is ascertainable from changes in distance 12, on absolute velocity 9 of vehicle 2 calculable from the relative velocity; and on the steering position of vehicle 1, this evaluator now checks whether it is possible for first vehicle 1 to pull out into passing lane 5 of street 14 without colliding with vehicle 2 driving directly in front. In the case of large distances, as exist in FIG. 1 between first vehicle 1 and directly preceding vehicle 2, a passing maneuver is conceivable in principle. In the method according to the present invention, distance 12 between first vehicle 1 and directly preceding vehicle 2 is reduced by accelerating first vehicle 1, and in so doing, increasing the velocity of first vehicle 1 in such a way, that first vehicle 1 can pull out into passing lane 5 of street 14 without disturbing the traffic in the form of third vehicle 3 in passing lane 5.

To activate such a control, the driver of first vehicle 1 operates left turn signal light 16, as also in the case of normal passing maneuvers, in order to inform the driver of vehicle 3 of his intention to pass. In the proposed method, operating left turn signal light 16 of vehicle 1 triggers a continuous monitoring of distance 12 between first vehicle 1 and directly preceding vehicle 2, in order to determine whether this actually existing distance 12 falls below a minimum distance 13, which is smaller than the former. If this minimum distance 13 is not yet reached, then the significance of this for vehicle 1 is that distance 12 can be reduced by accelerating vehicle 1, in order to adjust to the normally higher flow speed of the passing traffic in passing lane 5. In this case, minimum distance 13 between first vehicle 1 and directly preceding vehicle 2 is determined by the minimum distance required by law. During an accelerating maneuver, provided that passing lane 5 of street 14 is clear, the driver of first vehicle 1 will steer with increasing velocity 8 of vehicle 1 in the direction of passing lane 5, so that in the end, he pulls out from right lane 4 into passing lane 5. During the pulling-out maneuver, which is implemented at the same time as and in parallel to the accelerating maneuver for reducing distance 12, at the most, to minimum distance 13, it is constantly checked with the aid of detector 15 whether distance 12 has already been reduced to the minimum distance 13. At least shortly before or when distance 12 reaches minimum distance 13, it is tested in the form of an abort criterion, whether a passing maneuver, as was initiated by the driver of vehicle 1 by accelerating and/or steering vehicle 1 into passing lane 5, can be carried out without colliding with vehicle 2 driving directly in front.

Figure 2:
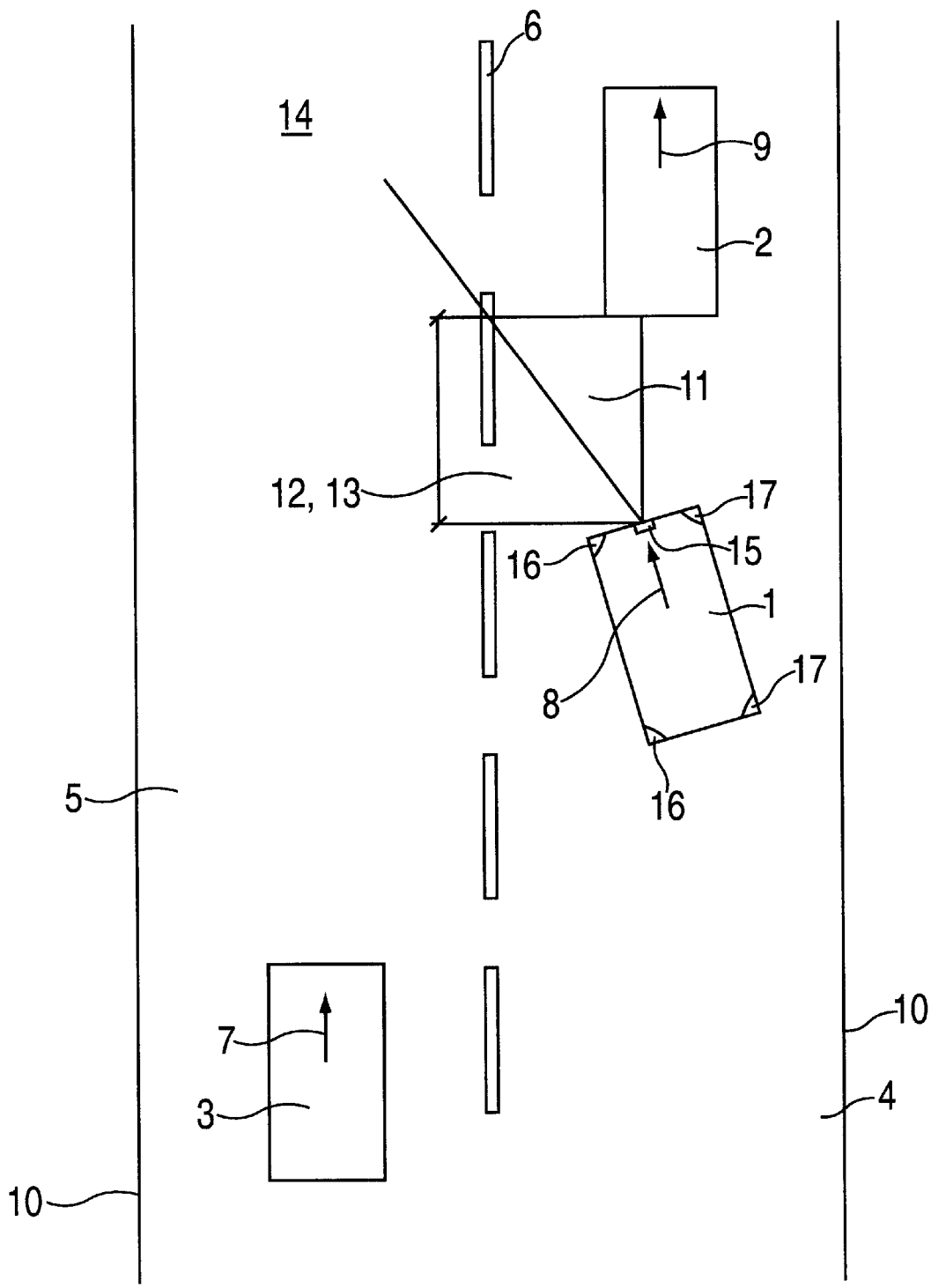
FIG. 2 shows a driving situation in which a driver of a first vehicle initiated a passing maneuver, where the distance from the vehicle driving directly in front falls below a minimum permissible value.
Figure 3:
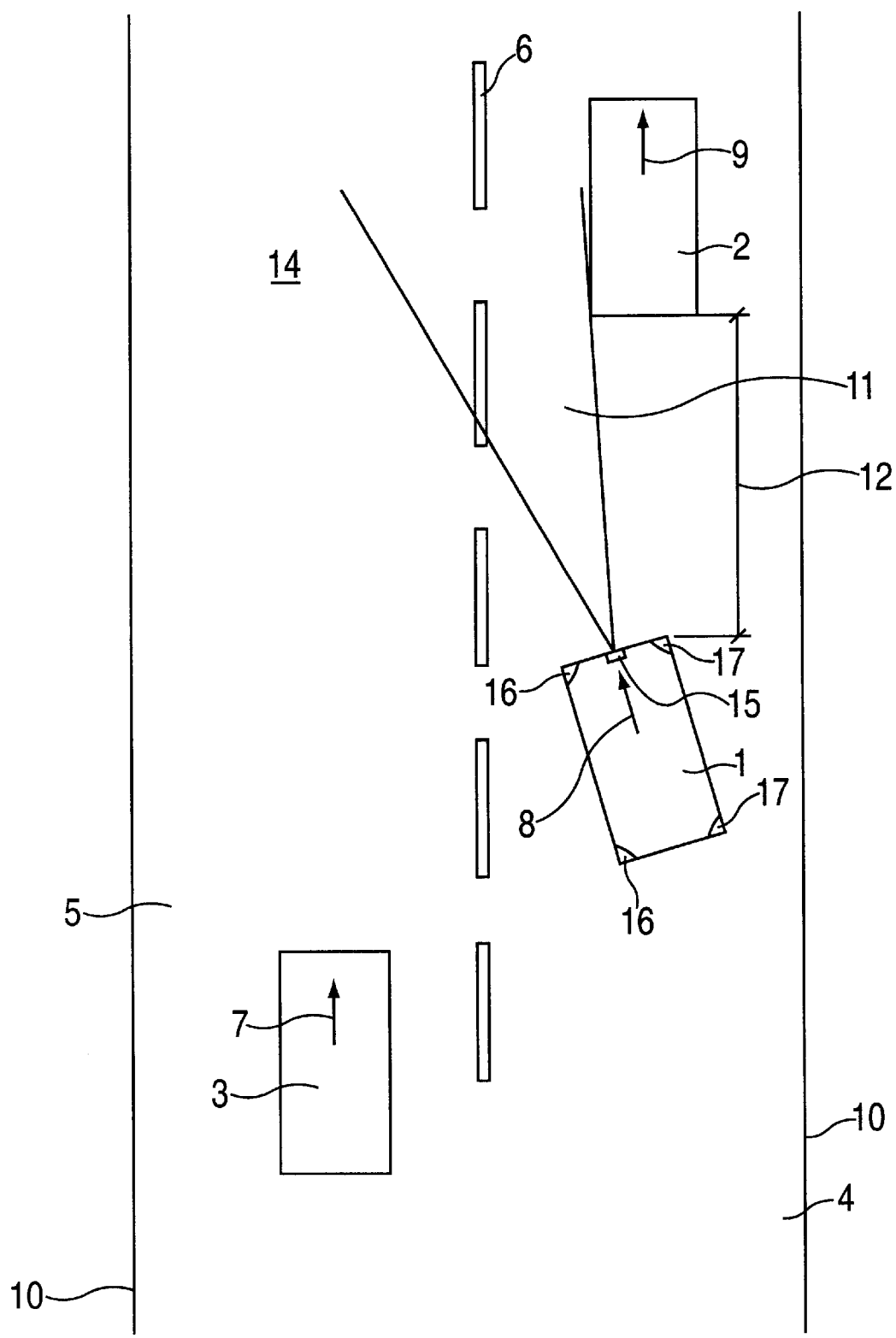
FIG. 3 shows a driving situation in which a driver of a first vehicle initiated a passing maneuver with sufficient distance from a vehicle driving directly in front.

An example of such a situation for the collision test is shown in FIG. 2 and in FIG. 3.

In the driving situation illustrated in FIG. 2, first vehicle 1 has closed up to a distance 12 or 13 from directly preceding vehicle 2, which would not allow directly preceding vehicle 2 to be passed without a collision between vehicle 1 and vehicle 2. This is recognized in the proposed method in that vehicle 2 driving directly in front is still inside detection range 11 of detector 15, or at least partially in this detection range 11. In order to prevent a collision of vehicle 1 with directly preceding vehicle 2, which would otherwise be unavoidable or, at least, highly probable, the passing maneuver is automatically aborted by reducing the acceleration of vehicle 1 or/and directly braking vehicle 1. This can occur automatically and directly after recognizing the possible collision situation without additional intervention of the driver of vehicle 1. Furthermore, in response to distance 12 to directly preceding vehicle 2 being increased in such a way, the driver will steer back in order to once again be able to drive straight ahead in the direction of lane 4 of street 14. At the same time, left turn signal light 16 can be reset automatically to inform the traffic following in passing lane 5, e.g. third vehicle 3, of the aborted passing maneuver, and to no longer disturb the traffic in this passing lane 5.

FIG. 3 illustrates a driving situation corresponding to FIG. 2, in which vehicle 1 can pass directly preceding vehicle 2 without colliding with it, since vehicle 2 driving directly in front is not in detection range 11 of detector 15. On the basis of his steering and distance 12 to directly preceding vehicle 2, the driver of vehicle 1 has created a driving situation in which, provided that the ratio of the speed of both vehicles 1 and 2 and ratio of the acceleration of both vehicles stay the same, he can pull past the directly preceding vehicle into passing lane 5 and thus, continue the passing maneuver. In this situation, the adaptive cruise control or cruise control in accordance with the proposed method can be interrupted, since the driver of first vehicle 1 can be responsible alone for continuing the passing maneuver at this point.

Figure 4:
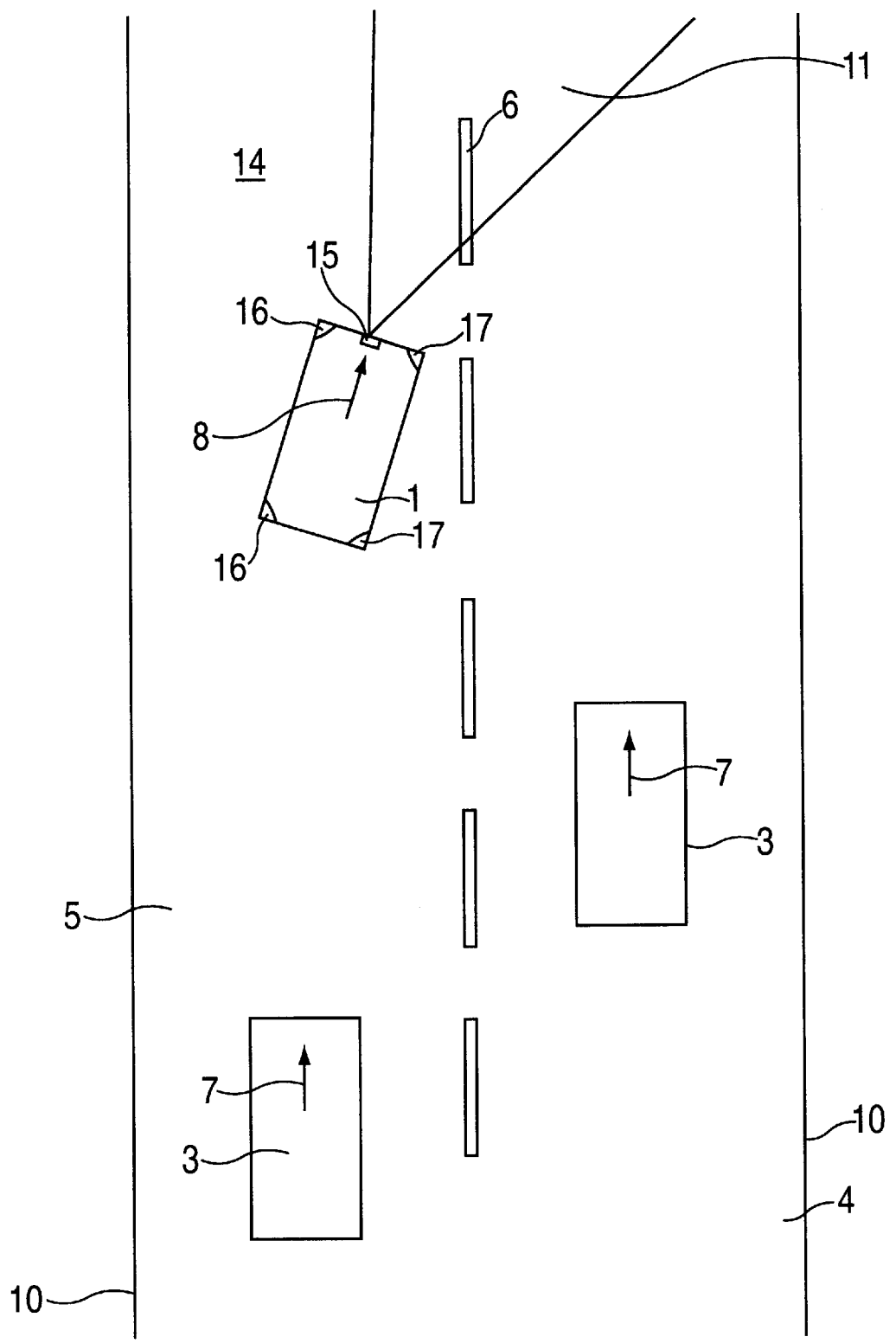
FIG. 4 shows a driving situation in which a first vehicle pulls in again after the passing maneuver.

FIG. 4 depicts a driving situation in which, after executing a passing maneuver, a first vehicle 1 wants to pull in again in front of another vehicle 3, in which case first vehicle 1 is able to continue regulating distance and speed in order to detect further vehicles, not shown here, in right traffic lane 4 of street 14, and consequently to contribute to setting a sufficient distance to these vehicles. In this case, the adaptive cruise control or cruise control can be activated by operating right turn signal lamp 17, which should signal a lane change from passing lane 5 to right lane 4. If the adaptive cruise control or cruise control is switched off while passing, that is, while vehicle 1 moves into passing lane 5, it can be especially important to the safety of pulling back in heavy traffic into right lane 4, that vehicle 1 remain a sufficient distance from a new vehicle driving directly in front, in order to meet the safety requirements.

REFERENCE NUMERAL LIST 1 first vehicle
2 vehicle driving directly in front
3 third vehicle
4 right lane
5 passing lane/oncoming lane
6 lane marking stripe
7 velocity of third vehicle
8 velocity of first vehicle
9 velocity of vehicle driving directly in front
10 roadway boundary
11 detection range
12 distance
13 minimum distance
14 street
15 detector
16 turn signal light on the driver's side
17 turn signal light on the passenger's side

What is claimed is:

1. A method for regulating speed and/or distance of a first vehicle to at least one second vehicle driving ahead of the first vehicle in connection with a passing maneuver, comprising the steps of providing a detection system so that the detection system is associated with the first vehicle, the detection system obtaining detection data by continuously detecting the at least one second vehicle when the at least one second vehicle is situated in front of the first vehicle, by continuously detecting a turn signal light position of the at least one second vehicle, and by continuously detecting a yaw rate and/or a steering position of the first vehicle;

providing an evaluator unit so that the evaluator unit is associated with the first vehicle, the evaluation unit continuously ascertaining a setpoint value for regulating a speed of the first vehicle and a distance of the first vehicle to the at least second vehicle from the detection data so that a defined minimum distance value is determined for a passing maneuver;

allowing a reduction of the distance of the first vehicle to the at least one second vehicle when the turn signal light of the first vehicle is activated until the distance is equal or greater than the defined minimum distance value;

determining using the evaluator unit whether the distance of the first vehicle to the at least one second vehicle is greater than the defined minimum distance value and determining whether the distance of the first vehicle to the at least one second vehicle is equal or greater to a permissible collision distance to determine whether a collision may occur during the passing maneuver;

activating a passing maneuver if the evaluator unit determines that the collision may not occur during the passing maneuver; and aborting a passing maneuver if the evaluator unit determines that the collision may occur during the passing maneuver.

2. The method as recited in claim 1 wherein the aborting a passing maneuver activates a reduction of acceleration of the first vehicle and/or a braking of the first vehicle.

3. The method as recited in claim 2 wherein the reduction of acceleration of the first vehicle and/or the braking of the first vehicle is effected until the detection system detects a safe distance between the first vehicle and the at least one second vehicle such that the evaluator unit determines that the safe distance is equal to or greater than a predefined safety distance.

4. The method as recited in claim 3 wherein the evaluator unit determines the collision may occur when the detection system of the first vehicle determines that the distance of the first vehicle to the at least one second vehicle is equal to the permissible collision distance and a defined time elapses and the at least one second vehicle is still detected by the detection system.

5. The method as recited in claim 1 wherein the evaluator unit determines the collision may occur when the detection system of the first vehicle detects that the first vehicle does not steer sufficiently such that the distance detected between the first vehicle to the at least one second vehicle is greater than or equal to the permissible collision distance so as to prevent the first vehicle from colliding with the at least one second vehicle detected directly ahead of the first vehicle.

6. The method as recited in claim 2 wherein the evaluator unit determines the collision may occur when the detection system detects that the first vehicle does not steer sufficiently such that the distance detected between the first vehicle to the at least one second vehicle is greater than or equal to the permissible collision distance so as to prevent the first vehicle from colliding with the at least one second vehicle detected directly ahead of the first vehicle.

7. The method as recited in claim 3 wherein the evaluator unit determines the collision may occur when the detection system detects that the first vehicle does not steer sufficiently such that the distance detected between the first vehicle to the at least one second vehicle is greater than or equal to the permissible collision distance so as to prevent the first vehicle from colliding with the at least one second vehicle detected directly ahead of the first vehicle.

8. The method as recited in claim 4 wherein the evaluator unit determines the collision may occur when the detection system detects that the first vehicle does not steer sufficiently such that the distance detected between the first vehicle to the at least one second vehicle is greater than or equal to the permissible collision distance so as to prevent the first vehicle from colliding with the at least one second vehicle detected directly ahead of the first vehicle.

9. The method as recited in one of the claims 1 through 4, wherein the turn signal light automatically resets in response to the aborting of the passing maneuver.

10. The method as recited in claim 1, further comprising the steps
determining an average traffic speed of passing lane vehicles using the detection system and the evaluator unit of the first vehicle;
accelerating the first vehicle until a first vehicle speed is determined to be equal to the average traffic speed of passing lane vehicles until the detection system and the evaluator unit determine that the distance between the first vehicle and the at least one second vehicle is equal to or greater than the minimum passing distance.

11. The method as recited in claim 1, further comprising the steps
determining an average traffic speed of passing lane vehicles using the detection system and the evaluator unit of the first vehicle;
accelerating the first vehicle until a first vehicle speed is determined to be equal to the average traffic speed of passing lane vehicles until the detection system and the evaluator unit determine that the distance between the first vehicle and the at least one second vehicle is equal to or greater than the permissible collision distance.

12. The method as recited in claim 10 wherein when the detection system and the evaluator unit of the first vehicle determines that the distance between the first vehicle and the at least one second vehicle is equal to or greater than the minimum passing distance, an indicator light of minimum passing distance reached is actuated.

13. The method as recited in claim 11 wherein when the detection system and the evaluator unit of the first vehicle determines that the distance between the first vehicle and the at least one second vehicle is equal to or greater than the permissible collision distance, an indicator light of permissible collision distance reached is actuated.

14. The method as recited in claim 12 wherein the first vehicle automatically brakes if the indicator light of minimum passing distance is lit for a predefined passing distance alert time.

15. The method as recited in claim 13 wherein the first vehicle automatically brakes if the indicator light of permissible collision distance is lit for a predefined collision alert time.

16. The method as recited in claim 1, further comprising the steps of
activating a turn signal light of the first vehicle to indicate movement;
providing sufficient steering into a different traffic lane;
resuming a predefined speed; and
determining the distance between the first vehicle and the at least one second vehicle in front of the first vehicle.

17. The method as recited in claim 1 wherein when initiating the passing maneuver, the state of the turn signal light is not considered until the detection system and the evaluator unit of the first vehicle determine that the detected speed of the first vehicle at a time t is equal to or greater than a predefined speed threshold value.

18. The method as recited in claim 17, wherein the predefined speed threshold value is preset to about 70 to 80 km/h.

19. The method as recited in one of the claims 17 or 18 wherein when the turn signal light is activated and the detection system and the evaluator unit of the first vehicle detect the speed of the first vehicle to be less than the speed threshold value, the evaluator unit indicates initiation of a turning-off maneuver and the speed and/or distance between the first vehicle and the at least one second vehicle are not regulated.

20. The method as recited in one of the claims 17 or 18 wherein when the turn signal light is activated and the detection system and the evaluator unit of the first vehicle detect the speed of the first vehicle to be less than the speed threshold value, the evaluator unit indicates initiation of a turning-off maneuver and the speed and/or distance between the first vehicle and the at least one second vehicle are regulated using a predefined turning-off-regulating characteristic.

21. A detection-evaluator system comprising hardware configured to perform a method for regulating speed and/or distance of a first vehicle to at least one second vehicle driving ahead of the first vehicle in connection with a passing maneuver, the method including the steps of:

providing a detection system so that the detection system is associated with the first vehicle, the detection system obtaining detection data by continuously detecting the at least one second vehicle when the at least one second vehicle is situated in front of the first vehicle, by continuously detecting a turn signal light position of the at least one second vehicle, and by continuously detecting a yaw rate and/or a steering position of the first vehicle;

providing an evaluator unit so that the evaluator unit is associated with the first vehicle, the evaluation unit continuously ascertaining a setpoint value for regulating a speed of the first vehicle and a distance of the first vehicle to the at least second vehicle from the detection data so that a defined minimum distance value is determined for a passing maneuver;

allowing a reduction of the distance of the first vehicle to the at least one second vehicle when the turn signal light of the first vehicle is activated until the distance is equal or greater than the defined minimum distance value;

determining using the evaluator unit whether the distance of the first vehicle to the at least one second vehicle is greater than the defined minimum distance value and determining whether the distance of the first vehicle to the at least one second vehicle is equal or greater to a permissible collision distance to determine whether a collision may occur during the passing maneuver;

activating a passing maneuver if the evaluator unit determines that the collision may not occur during the passing maneuver; and aborting a passing maneuver if the evaluator unit determines that the collision may occur during the passing maneuver.

* * * * *

UNITED STATES PATENT AND TRADEMARK OFFICE
CERTIFICATE OF CORRECTION

PATENT NO.    : 6,353,788 B1
DATED         : March 5, 2000
INVENTOR(S)   : Wolfgang Bäker, Thomas Ruchatz and Peter Andreas It is certified that error appears in the above-identified patent and that said Letters Patent is hereby corrected as shown below:

<u>Title page,</u>
Item [73], Assignee, should read -- Volkswagen AG, Wolfsburg/Fallersleben, Germany --.

Signed and Sealed this

Twentieth Day of August, 2002

*Attest:*

*Attesting Officer*

JAMES E. ROGAN
*Director of the United States Patent and Trademark Office*